United States Patent
Binek et al.

(10) Patent No.: US 12,486,800 B2
(45) Date of Patent: Dec. 2, 2025

(54) POWERPLANT WITH INTEGRATED HEAT PIPE

(71) Applicant: RTX Corporation, Farmington, CT (US)

(72) Inventors: Lawrence A. Binek, Glastonbury, CT (US); Yoel Bugin, Port St Lucie, FL (US); Edward L. Hieb, Aubrey, TX (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/640,975

(22) Filed: Apr. 19, 2024

(65) Prior Publication Data
US 2025/0327421 A1      Oct. 23, 2025

(51) Int. Cl.
*F02C 7/12*      (2006.01)
*H02K 9/19*      (2006.01)

(52) U.S. Cl.
CPC .............. *F02C 7/125* (2013.01); *H02K 9/19* (2013.01)

(58) Field of Classification Search
CPC .. F02C 7/125; F02C 7/16; H02K 9/19; H02K 9/20
See application file for complete search history.

(56) References Cited

U.S. PATENT DOCUMENTS

| | | | |
|---|---|---|---|
| 5,283,488 A * | 2/1994 | Ponnappan | H02K 9/225 310/55 |
| 7,642,682 B1 * | 1/2010 | Matheny | H02K 7/083 310/90 |
| 10,450,957 B2 | 10/2019 | Pearson | |
| 10,472,984 B2 | 11/2019 | Norton | |
| 10,605,213 B2 | 3/2020 | Peters | |
| 11,525,359 B1 * | 12/2022 | Binek | F01D 9/041 |
| 11,655,043 B2 | 5/2023 | Rabbi | |
| 11,683,919 B2 | 6/2023 | Bodla | |
| 11,745,847 B2 | 9/2023 | Rathay | |
| 11,858,644 B2 | 1/2024 | Goraj | |

(Continued)

FOREIGN PATENT DOCUMENTS

| | | | |
|---|---|---|---|
| EP | 3779128 A1 | 2/2021 | |
| EP | 4155193 A1 | 3/2023 | |
| GB | 2136886 A * | 9/1984 | F01D 25/125 |

OTHER PUBLICATIONS

EP Search Report for EP Patent Application No. 25170829.3 dated Aug. 7, 2025.

*Primary Examiner* — Courtney D Heinle
*Assistant Examiner* — Eric A Lange
(74) *Attorney, Agent, or Firm* — Getz Balich LLC

(57) ABSTRACT

An apparatus is provided for a powerplant. The apparatus includes a heat pipe extending axially along an axis from a first end of the heat pipe to a second end of the heat pipe. The heat pipe extends circumferentially around the axis. The heat pipe includes an evaporator region, a condenser region and a plurality of fluid passages. The evaporator region is disposed at the second end of the heat pipe. The condenser region is disposed at the first end of the heat pipe. The condenser region is disposed radially inboard of the evaporator region. The fluid passages are axially between and fluidly couple the evaporator region and the condenser region.

17 Claims, 9 Drawing Sheets

(56) References Cited

U.S. PATENT DOCUMENTS

| | | | |
|---|---|---|---|
| 2008/0159852 A1* | 7/2008 | Stephenson | F01D 5/046 |
| | | | 415/178 |
| 2014/0165570 A1 | 6/2014 | Herring | |
| 2014/0174701 A1* | 6/2014 | Kare | F28D 15/04 |
| | | | 165/104.26 |
| 2015/0300749 A1* | 10/2015 | Pal | F04D 29/38 |
| | | | 165/104.21 |
| 2016/0305279 A1 | 10/2016 | Gerstler | |
| 2017/0130606 A1* | 5/2017 | Niergarth | F02C 7/14 |
| 2017/0363007 A1 | 12/2017 | Xu | |
| 2018/0045138 A1* | 2/2018 | Suciu | F02C 7/04 |
| 2018/0058259 A1 | 3/2018 | Sharma | |
| 2018/0087398 A1 | 3/2018 | Forcier | |
| 2018/0306059 A1 | 10/2018 | Ranjan | |
| 2020/0109639 A1 | 4/2020 | Namadevan | |
| 2020/0336045 A1* | 10/2020 | Bodla | B64D 27/24 |
| 2023/0216379 A1 | 7/2023 | Fatemi | |

* cited by examiner

POWERPLANT WITH INTEGRATED HEAT PIPE

BACKGROUND OF THE DISCLOSURE

1. Technical Field

This disclosure relates generally to a powerplant such as a turbine engine and, more particularly, to heat transfer within the powerplant.

2. Background Information

A modern gas turbine engine includes various internal components that are subject to relatively high temperatures. To prevent material fatigue and deterioration, it is known in the art to bleed compressed air from a compressor section of the turbine engine and route that bleed air to select internal components for cooling. Bleeding compressed air from the compressor section, however, decreases efficiency of the turbine engine. In addition, as turbine engines are made more and more compact, it may be increasingly more difficult to include internal passages for routing the bleed air from the compressor section to the air cooled components. There is a need in the art therefore for alternative techniques for cooling internal components/structures of a turbine engine.

SUMMARY OF THE DISCLOSURE

According to an aspect of the present disclosure, an apparatus is provided for a powerplant. The apparatus includes a heat pipe extending axially along an axis from a first end of the heat pipe to a second end of the heat pipe. The heat pipe extends circumferentially around the axis. The heat pipe includes an evaporator region, a condenser region and a plurality of fluid passages. The evaporator region is disposed at the second end of the heat pipe. The condenser region is disposed at the first end of the heat pipe. The condenser region is disposed radially inboard of the evaporator region. The fluid passages are axially between and fluidly couple the evaporator region and the condenser region.

According to another aspect of the present disclosure, another apparatus is provided for a powerplant. The apparatus includes an inlet structure configured to form an inlet into a flowpath of the powerplant. The inlet structure includes a vane array and a heat pipe. The vane array includes a plurality of vanes arranged circumferentially about an axis. The vane array axially overlaps and circumscribes the heat pipe. The heat pipe extends axially along and circumferentially around the axis. The heat pipe includes an evaporator region, a condenser region and a plurality of fluid passages. The fluid passages are arranged axially between and fluidly couple the evaporator region and the condenser region.

According to still another aspect of the present disclosure, another apparatus is provided for a powerplant. The apparatus includes a support structure, a shaft and a bearing. The support structure includes a heat pipe that extends axially along and circumferentially around an axis. The heat pipe includes an evaporator region, a condenser region and a plurality of fluid passages. The fluid passages are arranged axially between and fluidly couple the evaporator region and the condenser region. The shaft is rotatable about the axis. The bearing rotatably mounts the shaft to the support structure. The heat pipe axially overlaps and circumscribes the bearing.

The fluid passages may include a first fluid passage and a second fluid passage. The heat pipe includes a closed-loop internal fluid circuit which extends from the evaporator region, through the first fluid passage, the condenser region and the second fluid passage, back to the evaporator region.

The heat pipe may also include a working fluid. The heat pipe may be configured to circulate the working fluid through the closed-loop internal fluid circuit.

The first fluid passage may be a liquid passage. The heat pipe may be configured to flow the working fluid in a liquid phase through the liquid passage from the condensing region to the evaporator region. The second fluid passage may be a gas passage. The heat pipe may be configured to flow the working fluid in a gaseous phase through the gas passage from the evaporator region to the condenser region.

The gas passage may be disposed radially outboard of and may extend circumferentially about the liquid passage as the gas passage and the liquid passage may extend axially between the evaporator region and the condenser region.

The liquid passage may be an inner liquid passage. The fluid passages may also include an outer liquid passage. The outer liquid passage may be disposed radially outboard of and may extend circumferentially about the gas passage as the outer liquid passage, and the gas passage may extend axially between the evaporator region and the condenser region.

The liquid passage may be disposed radially outboard of and extend circumferentially about the gas passage as the liquid passage and the gas passage extend axially between the evaporator region and the condenser region.

The liquid passage may be filled with a lattice structure.

At least one of the passages may have an annular cross-sectional geometry at a location axially between the evaporator region and the condenser region.

The evaporator region may have annular cross-sectional geometry at the second end of the heat pipe.

The evaporator region may include a plurality of evaporators arranged circumferentially about the axis.

The condenser region may include a plurality of condensers arranged circumferentially about the axis.

The condensers may project radially inward from at least one of the passages.

The apparatus may also include a vane array including a plurality of vanes arranged circumferentially about the axis. Each of the condensers may be configured with a respective one of the vanes.

At least one of the passages may be divided circumferentially into a plurality of sub-passages.

The apparatus may also include a support structure, a shaft and a bearing. The support structure may include the heat pipe. The shaft may be rotatable about the axis. The bearing may rotatably mount the shaft to the support structure. The heat pipe may extend axially along and circumscribe the bearing.

The apparatus may also include a support structure and an electric machine. The support structure may include the heat pipe. The electric machine may be at least partially housed within a cavity of the support structure. The heat pipe may extend axially along and circumscribe the electric machine. The heat pipe may be configured to transfer heat energy away from the electric machine.

The apparatus may also include an inlet structure for the powerplant. The inlet structure may include the heat pipe and a vane array that axially overlaps and circumscribes the heat pipe. The vane array may include a plurality of vanes arranged circumferentially about the axis.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
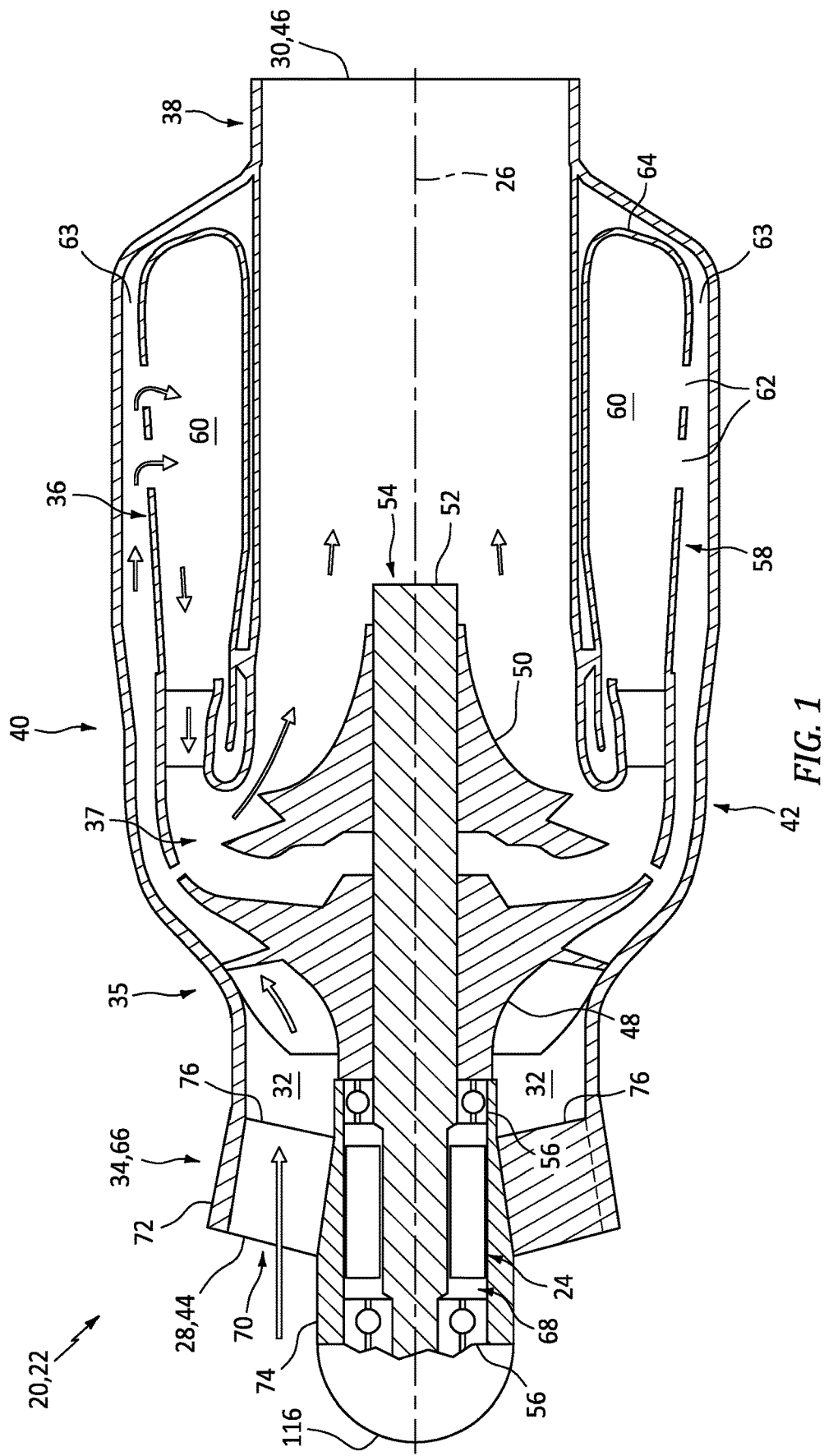
FIG. 1 is a schematic side sectional illustration of a powerplant.

FIG. 1 illustrates a powerplant 20 for an aircraft. The aircraft may be an airplane, a drone (e.g., an unmanned aerial vehicle (UAV)) or any other manned or unmanned aerial vehicle or system. The aircraft powerplant 20 may be configured as, or otherwise included as part of, a propulsion system and/or a power generation system for the aircraft. The aircraft powerplant 20 of FIG. 1, for example, is configured as a single spool, radial-flow turbojet gas turbine engine 22 with an electric machine 24. The aircraft powerplant 20 of the present disclosure, however, is not limited to single spool turbine engines nor to turbojet turbine engines. Moreover, it is contemplated the powerplant 20 may be used for non-aircraft applications; e.g., a ground-based industrial power generation system.

The turbine engine 22 of FIG. 1 extends axially along an axis 26 from a forward, upstream airflow inlet 28 into the turbine engine 22 to an aft, downstream combustion products exhaust 30 from the turbine engine 22. The axis 26 may be a centerline axis of the turbine engine 22. The axis 26 may be a centerline axis of one or more components and/or structures of the turbine engine 22. The axis 26 may also or alternatively be a rotational axis for one or more rotating components within the turbine engine 22.

The turbine engine 22 includes a (e.g., annular) core flowpath 32, an inlet section 34, a compressor section 35, a (e.g., reverse flow) combustor section 36, a turbine section 37 and an exhaust section 38. At least (or only) the compressor section 35, the combustor section 36 and the turbine section 37 may form a core 40 of the turbine engine 22. The turbine engine 22 also includes a stationary engine structure 42. Briefly, this engine structure 42 may house and/or form the engine sections 35-37. The engine structure 42 may also form the engine sections 34 and 38.

The core flowpath 32 extends within the turbine engine 22 and its engine core 40 from an airflow inlet 44 into the core flowpath 32 to a combustion products exhaust 46 from the core flowpath 32. More particularly, the core flowpath 32 of FIG. 1 extends sequentially through the inlet section 34, the compressor section 35, the combustor section 36, the turbine section 37 and the exhaust section 38 between the core inlet 44 and the core exhaust 46. The core inlet 44 of FIG. 1 forms the engine inlet 28 into the turbine engine 22. The core exhaust 46 of FIG. 1 forms the engine exhaust 30 from the turbine engine 22. However, the core inlet 44 may alternatively be discrete and downstream from the engine inlet 28 and/or the core exhaust 46 may alternatively be discrete and upstream from the engine exhaust 30.

The compressor section 35 includes a bladed compressor rotor 48. The turbine section 37 includes a bladed turbine rotor 50. Each of these engine rotors 48, 50 includes a rotor base (e.g., a hub or a disk) and a plurality of rotor blades (e.g., vanes or airfoils) arranged circumferentially around and connected to the rotor base. The rotor blades, for example, may be formed integral with or mechanically fastened, welded, brazed and/or otherwise attached to the respective rotor base.

The compressor rotor 48 may be configured as a radial flow compressor rotor (e.g., an axial inflow-radial outflow compressor rotor), and the compressor section 35 may be configured as a radial flow compressor section. The turbine rotor 50 may be configured as a radial flow turbine rotor (e.g., a radial inflow-axial outflow turbine rotor), and the turbine section 37 may be configured as a radial flow turbine section. The compressor rotor 48 is connected to the turbine rotor 50 through an engine shaft 52. At least (or only) the compressor rotor 48, the turbine rotor 50 and the engine shaft 52 collectively form an engine rotating assembly 54; e.g., a spool of the turbine engine 22 and its engine core 40. This engine rotating assembly 54 and its engine shaft 52 are rotatably supported by the engine structure 42 through a plurality of engine bearings 56; e.g., rolling element bearings, journal bearings, etc. The engine rotating assembly 54 and its members 48, 50 and 52 may thereby rotate about the axis 26.

The combustor section 36 includes an annular combustor 58 with an annular combustion chamber 60. The combustor 58 of FIG. 1 is configured as a reverse flow combustor. Inlet ports 62 and/or flow tubes into the combustion chamber 60, for example, may be arranged at (e.g., on, adjacent or proximate) and/or towards an aft bulkhead wall 64 of the combustor 58. An outlet from the combustor 58 may be arranged axially aft of an inlet to the turbine section 37. The combustor 58 may also be arranged radially outboard of and/or axially overlap (e.g., extend along) at least a (e.g., aft) portion of the turbine section 37. With this arrangement, the core flowpath 32 of FIG. 1 reverses direction (e.g., from a forward-to-aft direction to an aft-to-forward direction) a first time as the core flowpath 32 extends from an annular diffuser plenum 63 surrounding the combustor 58 into the combustion chamber 60. The core flowpath 32 of FIG. 1 then reverses direction (e.g., from the aft-to-forward direction to the forward-to-aft direction) a second time as the core flowpath 32 extends from the combustion chamber 60 into the turbine section 37.

During turbine engine operation, air enters the turbine engine 22 through the inlet section 34 and its core inlet 44. The inlet section 34 directs the air from the core inlet 44 into the core flowpath 32 and the compressor section 35. The air entering the core flowpath 32 may be referred to as "core air". This core air is compressed by the compressor rotor 48.

The compressed core air is directed through a diffuser and its diffuser plenum 63 into the combustion chamber 60. Fuel is injected and mixed with the compressed core air to provide a fuel-air mixture. This fuel-air mixture is ignited within the combustion chamber 60, and combustion products thereof flow through the turbine section 37 and drive rotation of the turbine rotor 50 about the axis 26. The rotation of the turbine rotor 50 drives rotation of the compressor rotor 48 about the axis 26 and, thus, compression of the air received from the core inlet 44. The exhaust section 38 directs the combustion products out of the turbine engine 22 into an environment external to the aircraft to provide forward engine thrust.

The electric machine 24 may be integrated with the turbine engine 22. The electric machine 24 of FIG. 1, for example, is housed within an inlet structure 66 of the turbine engine 22 and its engine structure 42. The electric machine 24 of FIG. 1, in particular, is disposed within an internal cavity 68 (e.g., an inner bore) of the inlet structure 66 and is located axially between the engine bearings 56.

The inlet structure 66 of FIG. 1 forms the inlet section 34 of the turbine engine 22. The inlet structure 66 of FIG. 1 also structurally supports the engine rotating assembly 54 within the engine structure 42 through the engine bearings 56. The inlet structure 66 of FIG. 1, for example, includes an inlet vane array 70, a radial outer platform structure 72 and a radial inner platform structure 74.

The inlet vane array 70 may be arranged at the core inlet 44. The inlet vane array 70 includes a plurality of inlet vanes 76; e.g., inlet guide vanes, struts, etc. The inlet vanes 76 are arranged and may be equispaced circumferentially about the axis 26 in an annular array; e.g., a circular array. Each of the inlet vanes 76 extends radially across the core flowpath 32 (in a radial outward direction away from the axis 26) from the inner platform structure 74 to the outer platform structure 72. The inlet vanes 76 may thereby structurally tie the inner platform structure 74 to the outer platform structure 72. The inlet vanes 76 may also be configured to condition (e.g., impart swirl to, etc.) the core air entering the compressor section 35.

The outer platform structure 72 extends longitudinally (e.g., generally axially in FIG. 1) along the core flowpath 32. The outer platform structure 72 extends circumferentially about (e.g., completely around) the axis 26 providing the outer platform structure 72 with, for example, a full-hoop (e.g., tubular) geometry. The outer platform structure 72 thereby forms a radial outer peripheral boundary of the core flowpath 32 through the inlet section 34 to the core inlet 44.

The inner platform structure 74 extends longitudinally (e.g., generally axially in FIG. 1) along the core flowpath 32. The inner platform structure 74 extends circumferentially about (e.g., completely around) the axis 26 providing the inner platform structure 74 with, for example, a full-hoop (e.g., tubular) geometry. The inner platform structure 74 thereby forms a radial inner peripheral boundary of the core flowpath 32 through the inlet section 34 to the core inlet 44. The inner platform structure 74 also forms a support structure for the engine bearings 56 and the electric machine 24. The inner platform structure 74, for example, extends axially along and circumferentially about (e.g., circumscribes) one or more of the engine bearings 56 and the electric machine 24. The engine bearings 56 and the electric machine 24 may thereby be (e.g., directly) mounted to and supported by the inner platform structure 74. Here, the inner platform structure 74 also forms a radial outer peripheral boundary of the internal cavity 68 within the inlet structure 66.

Figure 2:
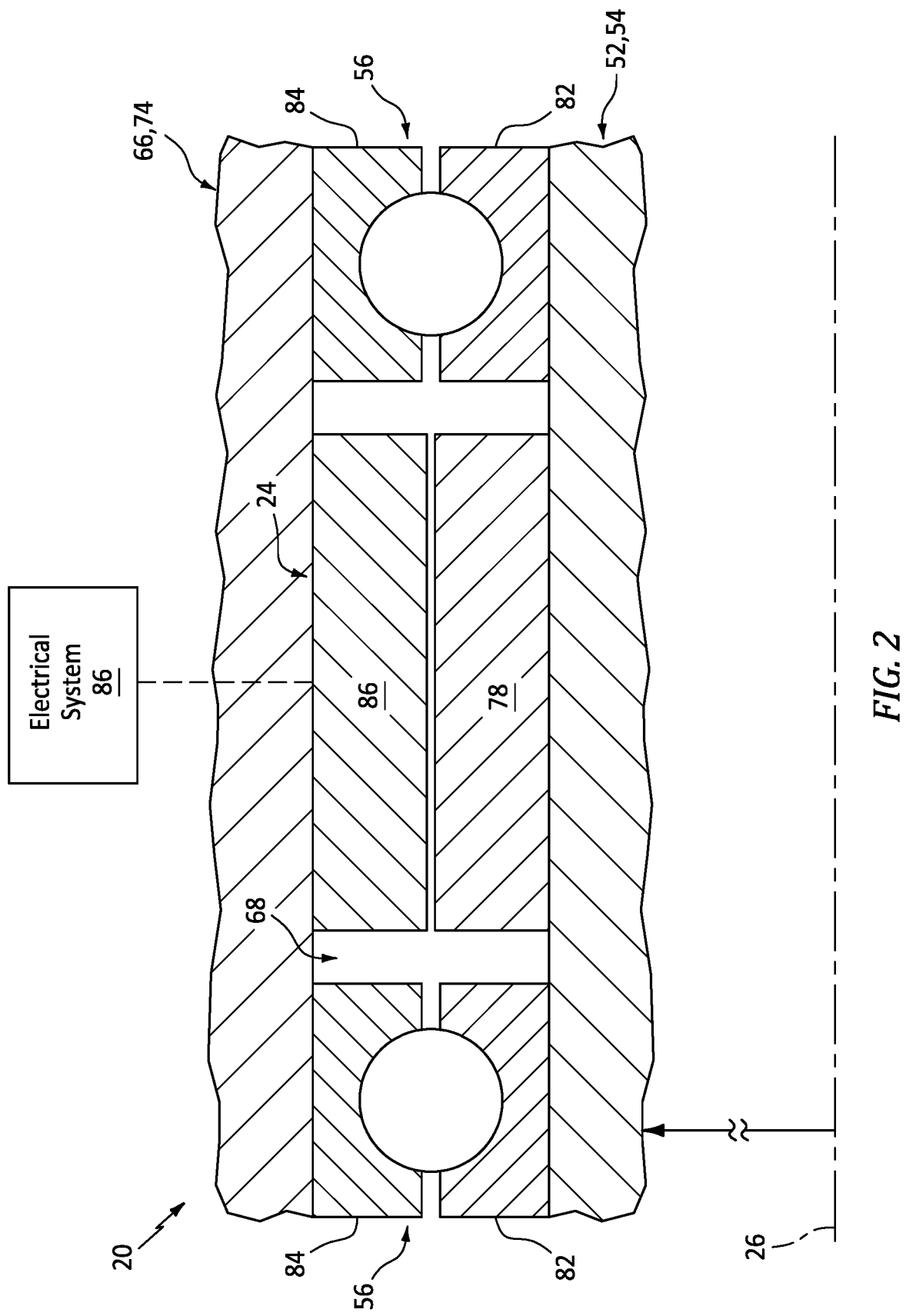
FIG. 2 is a partial schematic side sectional illustration of the powerplant along an electric machine.

Referring to FIG. 2, the electric machine 24 may be configured as a permanent magnet generator (PMG). The electric machine 24 of FIG. 2, for example, includes an electric machine rotor 78 and an electric machine stator 80. Here, the inlet structure 66 and its inner platform structure 74 may provide a housing for the electric machine 24 and its members 78 and 80. The machine rotor 78 of FIG. 2 is fixedly attached to the engine rotating assembly 54 and its engine shaft 52, for example axially between inner races 82 of the engine bearings 56. The machine rotor 78 is thereby configured to rotate about the axis 26 with the engine rotating assembly 54 and its engine shaft 52. The machine stator 80 of FIG. 2 is fixedly attached to the inner platform structure 74, for example axially between outer races 84 of the engine bearings 56. The machine stator 80 is disposed radially outboard of and circumscribes the machine rotor 78. With this arrangement, the electric machine 24 is configured as a radial flux electric machine; e.g., a radial flux permanent magnet generator. The electric machine 24 of the present disclosure, however, is not limited to such an exemplary rotor-stator configuration nor to radial flux arrangements.

During turbine engine operation, the rotation of the engine rotating assembly 54 drives rotation of the machine rotor 78 about the axis 26. The rotation of the machine rotor 78 may generate an electromagnetic field with the machine stator 80, and the machine stator 80 may convert energy from the electromagnetic field into the electricity. The electric machine 24 may then provide this electricity to an electrical system 86 (schematically shown) of the aircraft for storage, further use and/or distribution to one or more other aircraft and/or powerplant components. Here, the electric machine 24 is configured as a dedicated electric generator. However, it is contemplated the electric machine 24 may alternatively be configured as a motor-generator, or a dedicated electric motor in other embodiments.

Figure 3:
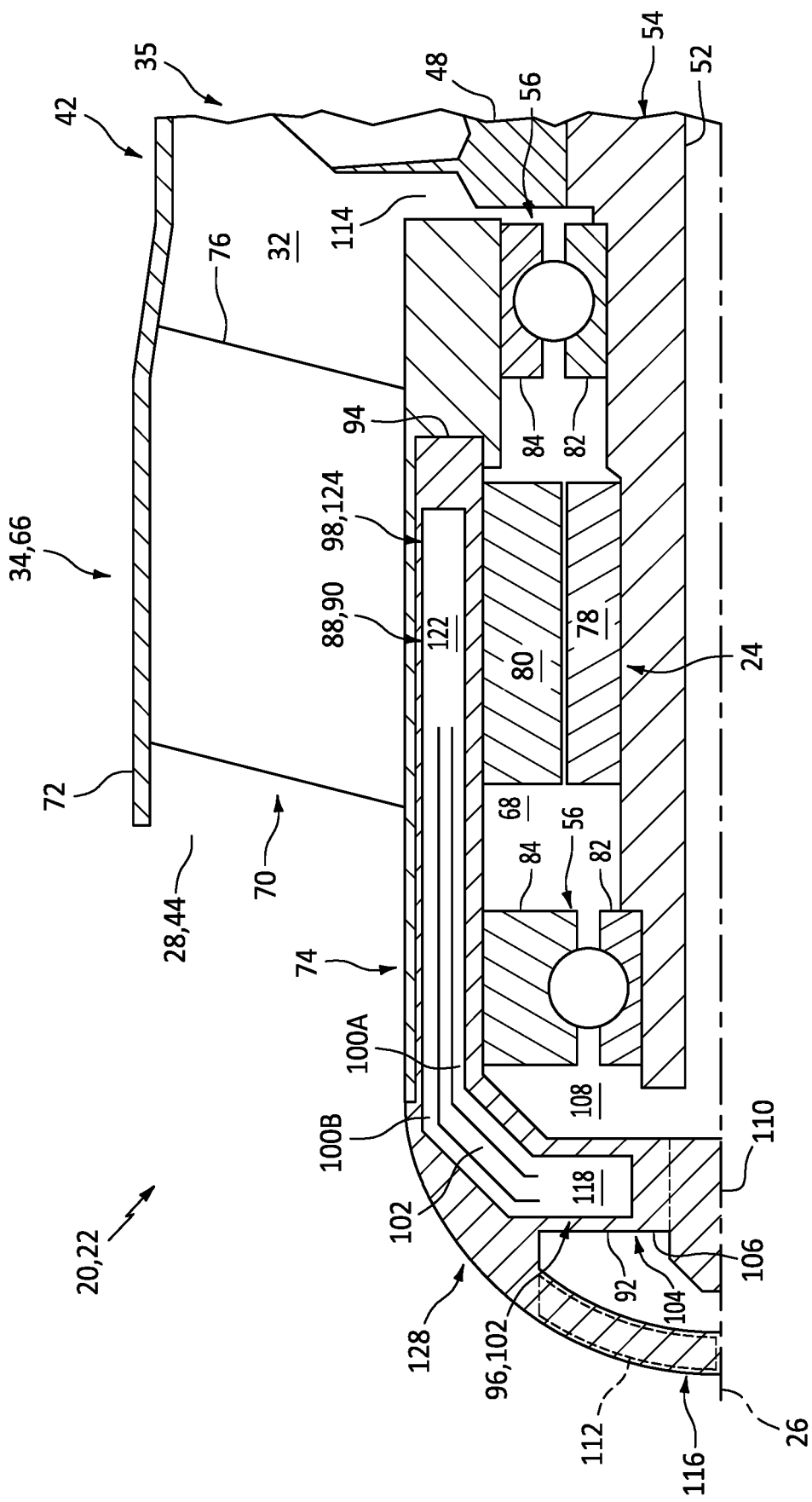
FIG. 3 is a partial schematic side sectional illustration of the powerplant along an inlet section.

Referring to FIG. 3, the electric machine 24 may generate relatively high quantities of heat energy during electric machine operation. To dissipate at least some of this heat energy, the inlet structure 66 and its inner platform structure 74 is configured with a (e.g., passive) heat transfer device 88 thermally coupled with the electric machine 24 and its machine stator 80.

The heat transfer device 88 is configured to (e.g., passively) transfer the heat energy generated by the electric machine 24 to a flow of cooling air; e.g., a heat sink. More particularly, the heat transfer device 88 is configured to receive (e.g., absorb) the heat energy from the electric machine 24 and then dissipate (e.g., reject) that heat energy into the cooling air. The heat transfer device 88 may thereby cool the electric machine 24 and heat the cooling air.

Figure 4:
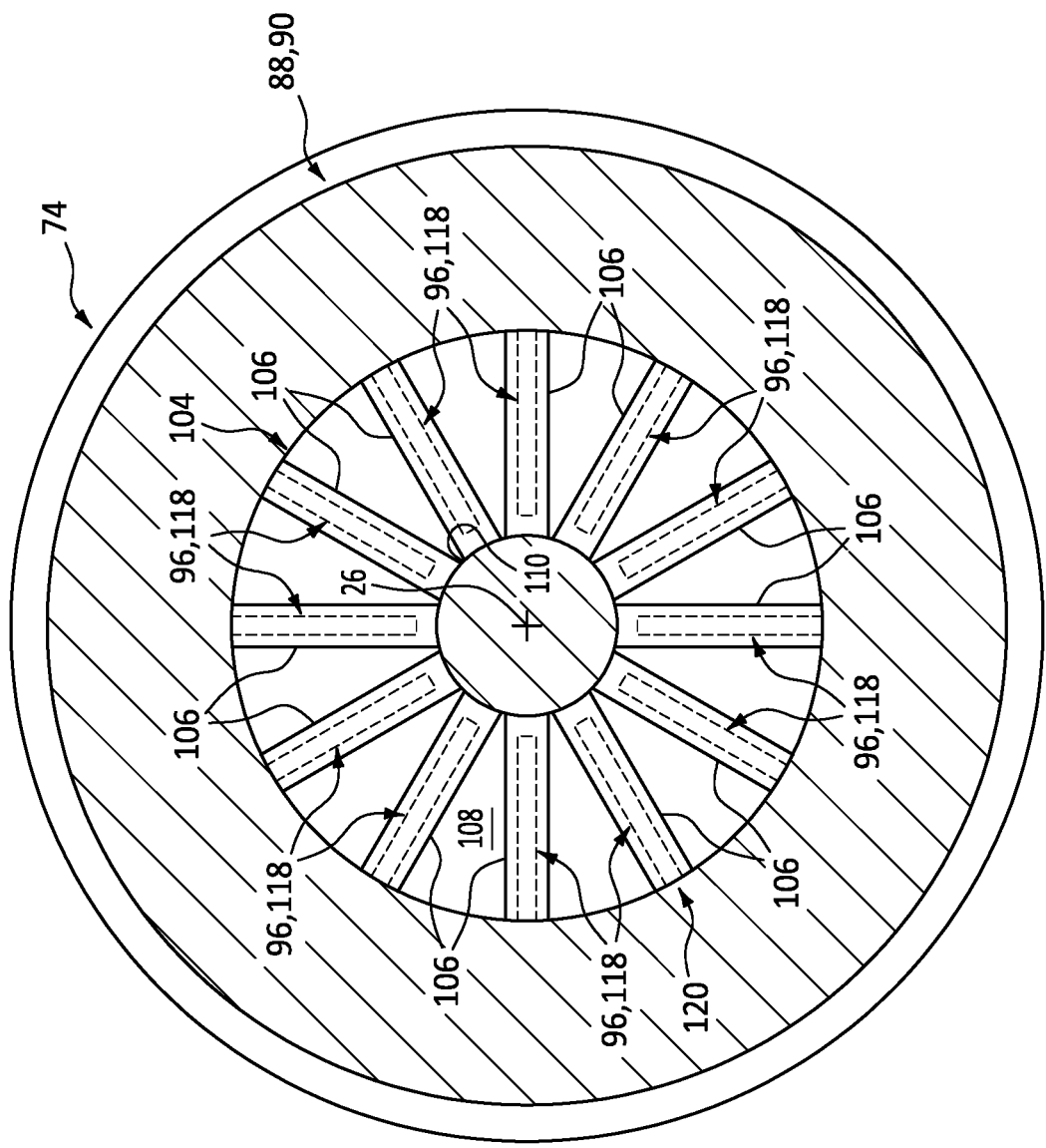
FIG. 4 is a cross-sectional illustration of a heat pipe at a condenser region.
Figure 5:
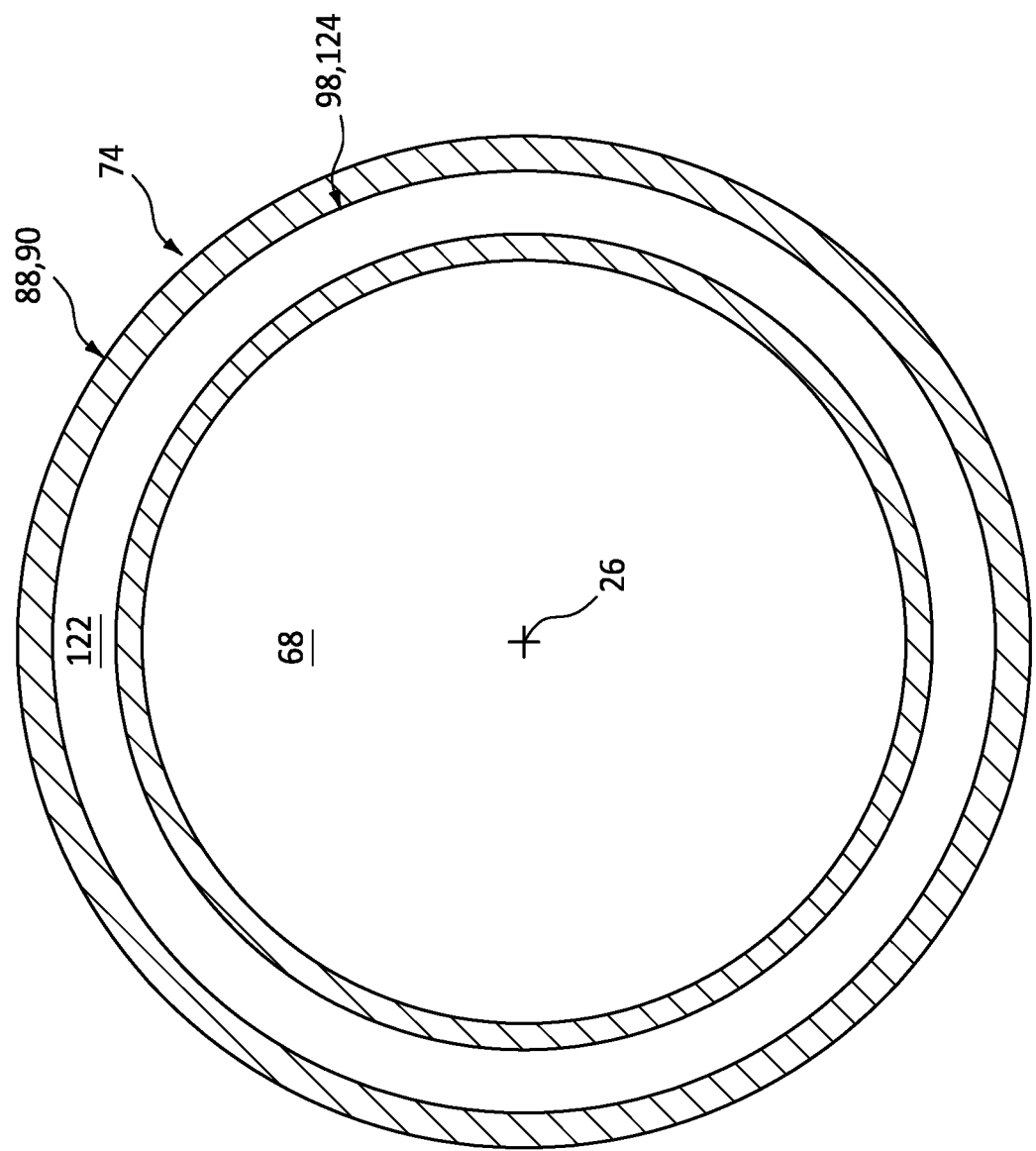
FIG. 5 is a cross-sectional illustration of the heat pipe at an evaporator region.
Figure 6:
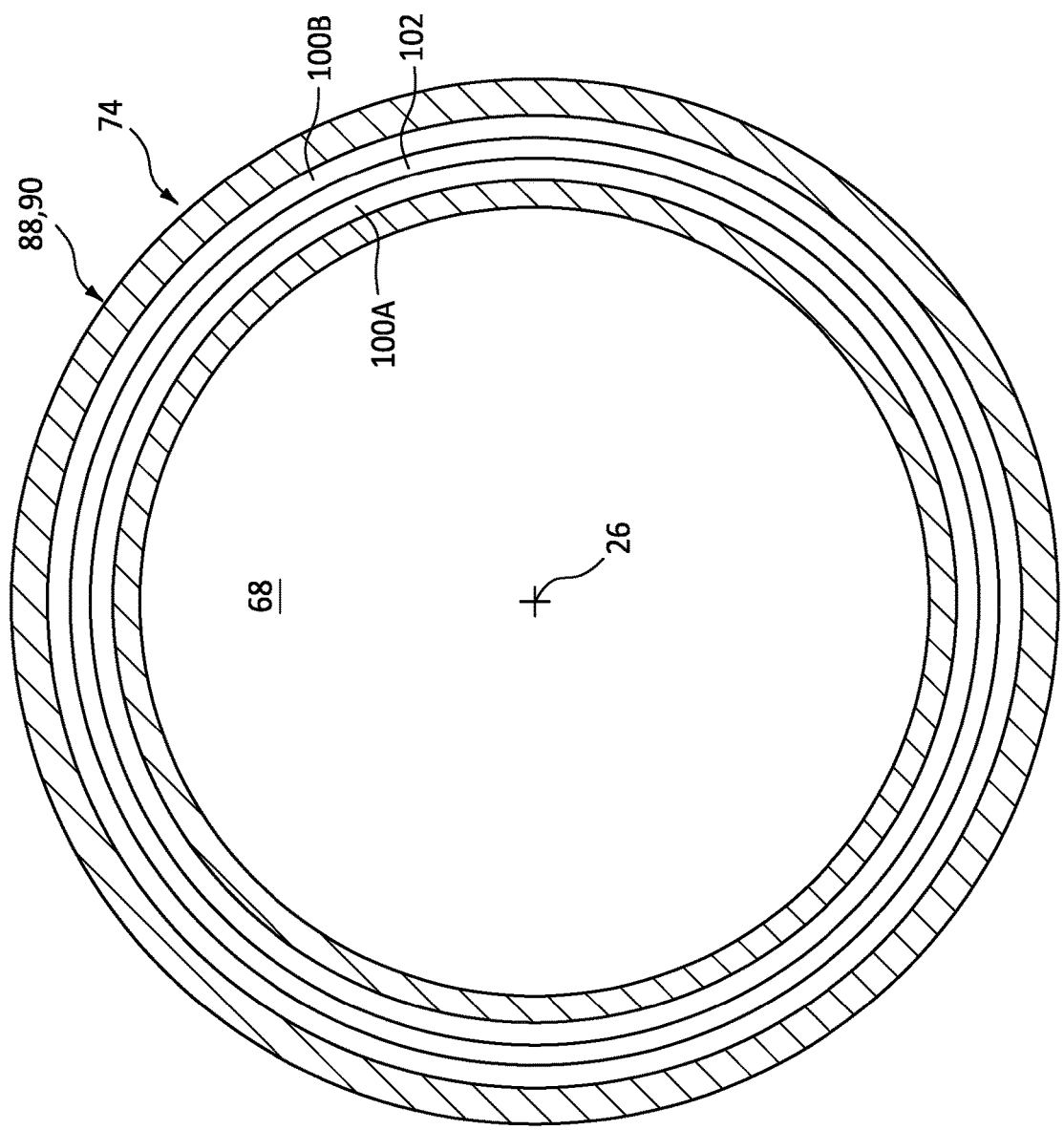
FIG. 6 is a cross-sectional illustration of the heat pipe at fluid circuit passages.
Figure 7A:
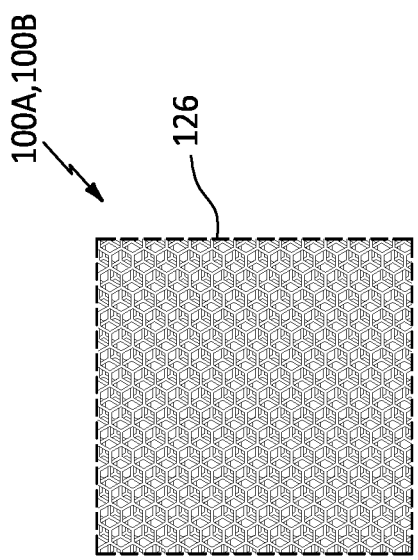
FIGS. 7A-D are illustrations of various lattice structures for the fluid circuit passages.
Figure 7B:
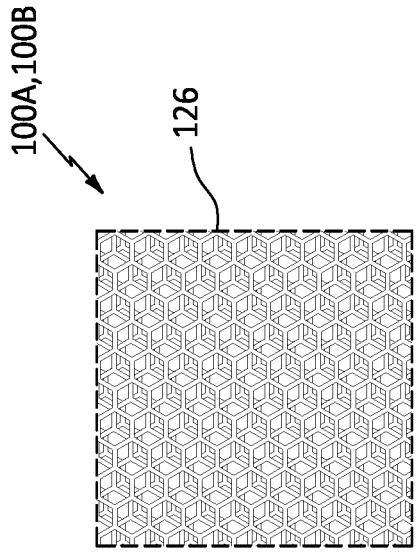
Figure 7C:
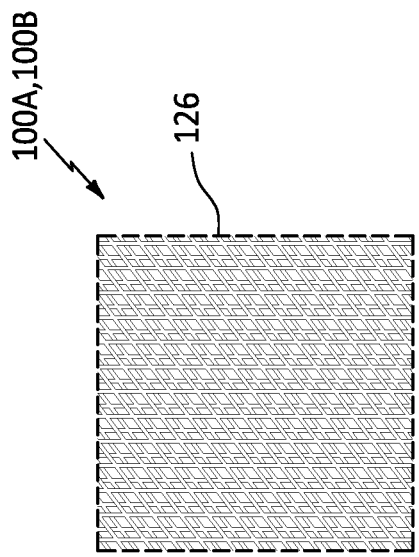
Figure 7D:
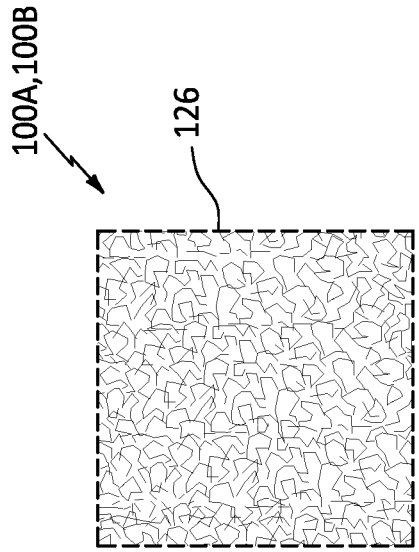

The heat transfer device 88 of FIG. 3 is configured as or otherwise includes a heat pipe 90. This heat pipe 90 extends axially along the axis 26 from a first end 92 (e.g., an upstream, forward end) of the heat pipe 90 to a second end 94 (e.g., a downstream, aft end) of the heat pipe 90. The heat pipe 90 extends radially from a radial inner side of the heat pipe 90 to a radial outer side of the heat pipe 90. Referring to FIGS. 4-6, the heat pipe 90 extends circumferentially about (e.g., completely around) the axis 26 providing the heat transfer device 88 and its heat pipe 90 with, for example, a full-hoop (e.g., annular) geometry. Referring to FIG. 3, the heat pipe 90 includes a working fluid (e.g., a phase change fluid) and a close-loop internal fluid circuit for circulating the working fluid within the heat pipe 90. The fluid circuit includes one or more condensers 96 (see also FIG. 4), at least (or only) one evaporator 98 (see also FIG. 5), one or more liquid passages 100A and 100B (generally referred to as "100") (see also FIG. 6) and at least (or only) one gas passage 102 (see also FIG. 6).

The working fluid may be a multi-phase (e.g., two-phase) working fluid. The working fluid, for example, is operable to change phase between a gaseous phase and a liquid phase during heat pipe operation. An example of the working fluid is a fluid including sodium (Na) and/or potassium (K). Another example of the working fluid is refrigerant. The present disclosure, however, is not limited to the foregoing exemplary working fluids.

Referring to FIG. 4, the condensers 96 may be integrated into a cooling vane array 104 and disposed at the heat pipe first end 92 (see FIG. 3). This cooling vane array 104 includes a plurality of cooling vanes 106. The cooling vanes 106 are arranged and may be equispaced circumferentially about the axis 26 in an annular array; e.g., a circular array. Each of the cooling vanes 106 of FIG. 3 extends radially across a cooling flowpath 108 (in a radial inward direction towards the axis 26) from the inner platform structure 74 to a center body 110. The cooling flowpath 108 extends within the inlet structure 66 between an inlet 112 (schematically shown in FIG. 3) into the cooling flowpath 108 and an outlet 114 from the cooling flowpath 108. More particularly, the cooling flowpath 108 extends from the cooling flowpath inlet 112, through an annular volume formed within the internal cavity 68 between (a) the engine rotating assembly 54 and its engine shaft 52 and (b) the inner platform structure 74, to the cooling flowpath outlet 114. The cooling flowpath inlet 112 may be formed by perforations in a nose cap 116 of the inlet structure 66; e.g., a mesh screen nose cap. The cooling flowpath inlet 112 may thereby direct cooling air from outside of the turbine engine 22 into the cooling flowpath 108; e.g., the same ambient air as directed into the core flowpath 32 through the core inlet 44. The cooling flowpath outlet 114 fluidly couples the cooling flowpath 108 to a section of the core flowpath 32; e.g., downstream of the inlet vane array 70 and upstream of the compressor rotor 48.

Each condenser 96 of FIG. 3 includes a condenser cavity 118 formed by and within a respective one of the cooling vanes 106. This condenser cavity 118 may be configured as a hollow cavity in that the condenser cavity 118 may not be filled with any internal structure such as a lattice structure or any other flow enhancing and/or impeding material. The condenser cavity 118 projects radially inward from the fluid circuit passages 100A, 100B and 102 into the respective cooling vane 106 to a distal end of the condenser cavity 118. In the arrangement of FIG. 3, the condenser cavity end is located within the respective cooling vane 106 near the center body 110. In other embodiments, however, it is contemplated the condenser cavity 118 may extend radially through the respective cooling vane 106 such that the cavity end is located in the center body 110. Referring to FIGS. 3 and 4, the condenser cavities 118 collectively form a condenser region 120 of the heat pipe 90.

The evaporator 98 of FIG. 3 is disposed at the heat pipe second end 94. The evaporator 98 of FIG. 3 includes an evaporator cavity 122 formed by and within the inner platform structure 74. This evaporator cavity 122 may be configured as a hollow cavity in that the evaporator cavity 122 may not be filled with an internal structure such as a lattice structure or any other flow enhancing and/or impeding material. The evaporator cavity 122 projects axially out from the fluid circuit passages 100A, 100B and 102 within the inner platform structure 74 to a distal end of the evaporator cavity 122. In the arrangement of FIG. 3, the evaporator cavity end is located within the inner platform structure 74 near (or adjacent) to an axial aft end of the electric machine 24. Referring to FIG. 5, the evaporator cavity 122 extends circumferentially about (e.g., completely around) the axis 26 within the inner platform structure 74. With this arrangement, the evaporator cavity 122 of FIGS. 3 and 5 extends axially along and circumferentially about (e.g., circumscribes) the electric machine 24. This evaporator cavity 122 forms an evaporator region 124 of the heat pipe 90. This evaporator region 124 and its evaporator cavity 122 of FIG. 3 are located radially outboard of the condenser region 120 and its condenser cavities 118.

The fluid circuit passages 100A, 100B and 102 of FIG. 3 are arranged axially between and fluidly couple the condenser region 120 and its condenser cavities 118 to the evaporator region 124 and its evaporator cavity 122. Each fluid circuit passage 100, 102 of FIG. 3, for example, projects axially within the inner platform structure 74 out from the evaporator region 124 and its evaporator cavity 122 towards the heat pipe first end 92. At or near the heat pipe first end 92, each fluid circuit passage 100, 102 of FIG. 3 turns radially inward and extends to the condenser region 120 and its condenser cavities 118. Referring to FIG. 6, each fluid circuit passage 100, 102 extends circumferentially about (e.g., completely around) the axis 26 providing that respective fluid circuit passage 100, 102 with, for example, a full-hoop (e.g., annular) cross-sectional geometry when viewed in a reference plane perpendicular to the axis 26. In the arrangement of FIG. 6, the inner liquid passage 100A is disposed radially between the internal cavity 68 and the gas passage 102. The gas passage 102 is disposed radially inboard of the gas passage 102; e.g., radially between the inner liquid passage 100A and the outer liquid passage 100B. The gas passage 102 thereby axially overlaps and may circumscribe the inner liquid passage 100A. The outer liquid passage 100B is disposed radially outboard of the gas passage 102; e.g., radially between the gas passage 102 and the core flowpath 32 (see FIG. 3). The outer liquid passage 100B thereby axially overlaps and may circumscribe the gas passage 102 and the inner liquid passage 100A. These fluid circuit passages 100 and 102 may collectively form an adiabatic region of the heat pipe 90.

The gas passage 102 may be configured as a hollow cavity in that the gas passage 102 may not be filled with an internal structure such as a lattice structure or any other flow enhancing and/or impeding material. By contrast, one or both of the liquid passages 100 may each be partially or completely filled with a porous lattice structure; e.g., a liquid wicking structure. Examples of such lattice structures 126 are shown in FIGS. 7A-D. The present disclosure, however, is not limited to such exemplary lattice structure configurations.

Referring to FIG. 3, the fluid circuit passages 100A, 100B and 102 are fluidly coupled in parallel between the condenser region 120 and the evaporator region 124. The fluid circuit thereby extends longitudinally from the evaporator region 124, sequentially through the gas passage 102, the condenser region 120 and the liquid passages 100 (in parallel), and back to the evaporator region 124.

During turbine engine operation, the heat pipe 90 transfers heat energy generated by the electric machine 24 (and/or the engine bearings 56) into the working fluid within the evaporator cavity 122 at the heat pipe second end 94. More particularly, the heat pipe 90 transfers the heat energy into a quantity of the working fluid within the evaporator region 124/the evaporator 98. During this heat energy transfer, the working fluid within the evaporator region 124 absorbs at least some or all of the heat energy received from the electric machine 24 (and/or the engine bearings 56). This heat energy absorption heats the working fluid such that a liquid phase of the working fluid ("liquid working fluid") may change phase to a gaseous phase of the working fluid ("gaseous working fluid"). The liquid working fluid may thereby evaporate or vaporize into the gaseous working fluid. This gaseous working fluid is subsequently directed (e.g., flows) through the gas passage 102 from the evaporator region 124 at the heat pipe second end 94 to the condenser region 120 at the heat pipe first end 92.

Within the condenser region 120 and its condensers 96, the heat pipe 90 transfers heat energy (e.g., some or all of the heat energy previously absorbed from the electric machine 24 and/or the engine bearings 56) from the working fluid into the cooling air through walls of the cooling vanes 106. More particularly, the heat pipe 90 transfers the heat energy out of a quantity of the working fluid within the condenser region 120/the condensers 96. During this heat energy transfer, the working fluid within the condenser region 120 rejects at least some or all of the heat energy into the cooling air. This heat energy rejection cools the working fluid such that the gaseous phase of the working fluid may change phase to the liquid phase of the working fluid. The gaseous working fluid may thereby condense into the liquid working fluid. This liquid working fluid is subsequently directed (e.g., flows) through the inner liquid passage 100A and/or the outer liquid passage 100B from the condenser region 120 at the heat pipe first end 92 back to the evaporator region 124 at the heat pipe second end 94 in order to, for example, repeat the heat transfer cycle.

Figure 8:
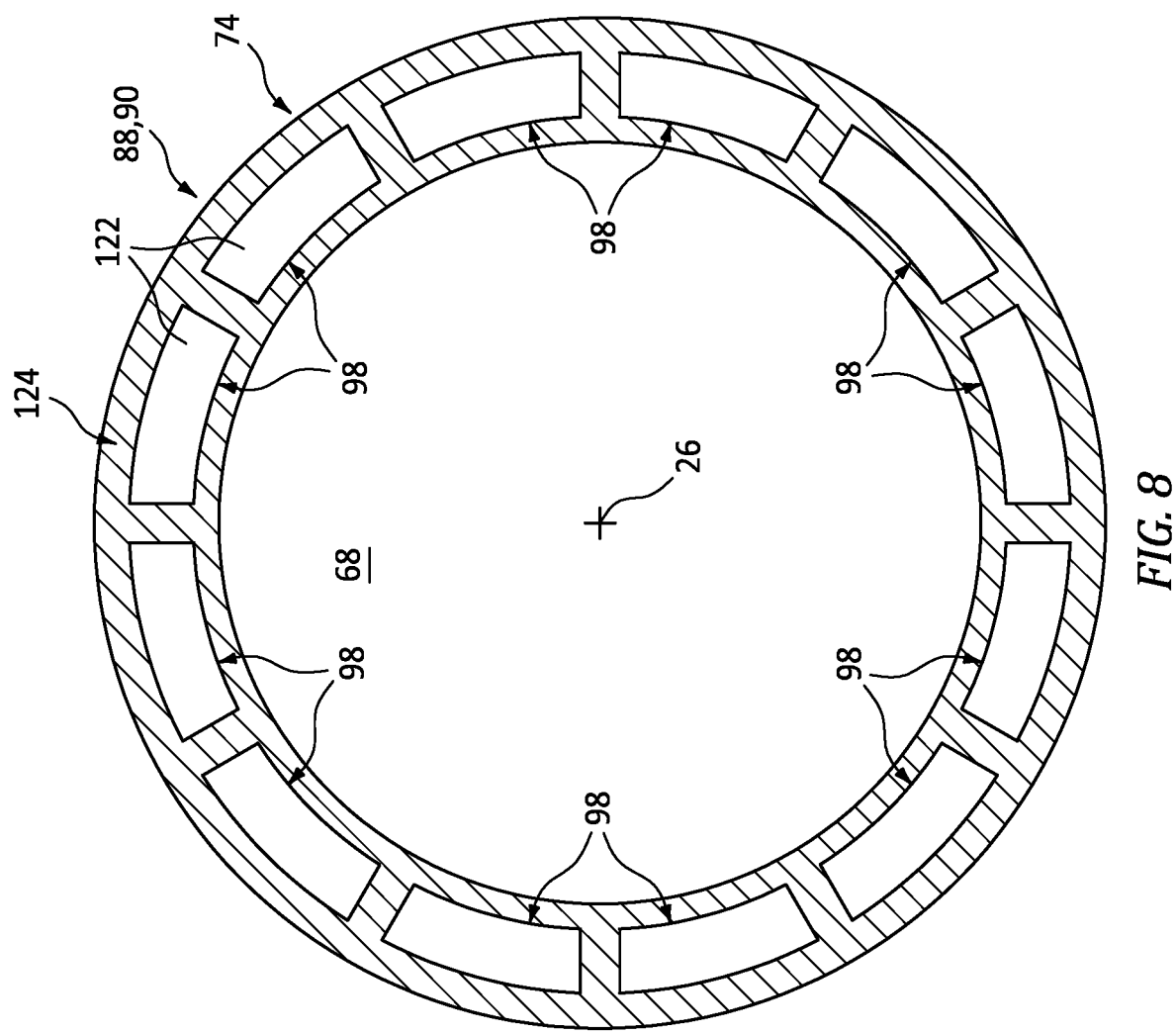
FIG. 8 is a cross-sectional illustration of the heat pipe at the evaporator region with multiple evaporators.

In some embodiments, referring to FIG. 5, the evaporator 98 and its evaporator cavity 122 may be configured with an annular cross-sectional geometry when viewed in the reference plane. In other embodiments, referring to FIG. 8, the evaporator region 124 may be formed from a plurality of evaporators 98. These evaporators 98 are arranged and may be equispaced circumferentially about the axis 26 in an annular array; e.g., a circular array. Each of the evaporator cavities 122 may have an arcuate (e.g., semi-circular, etc.) cross-sectional geometry when viewed in the reference plane. In such embodiments, a total number of the evaporators 98 included in the heat pipe 90 may be equal to or different (e.g., greater or less) than a total number of the condensers 96 (see FIG. 4) included in the heat pipe 90.

Figure 9:
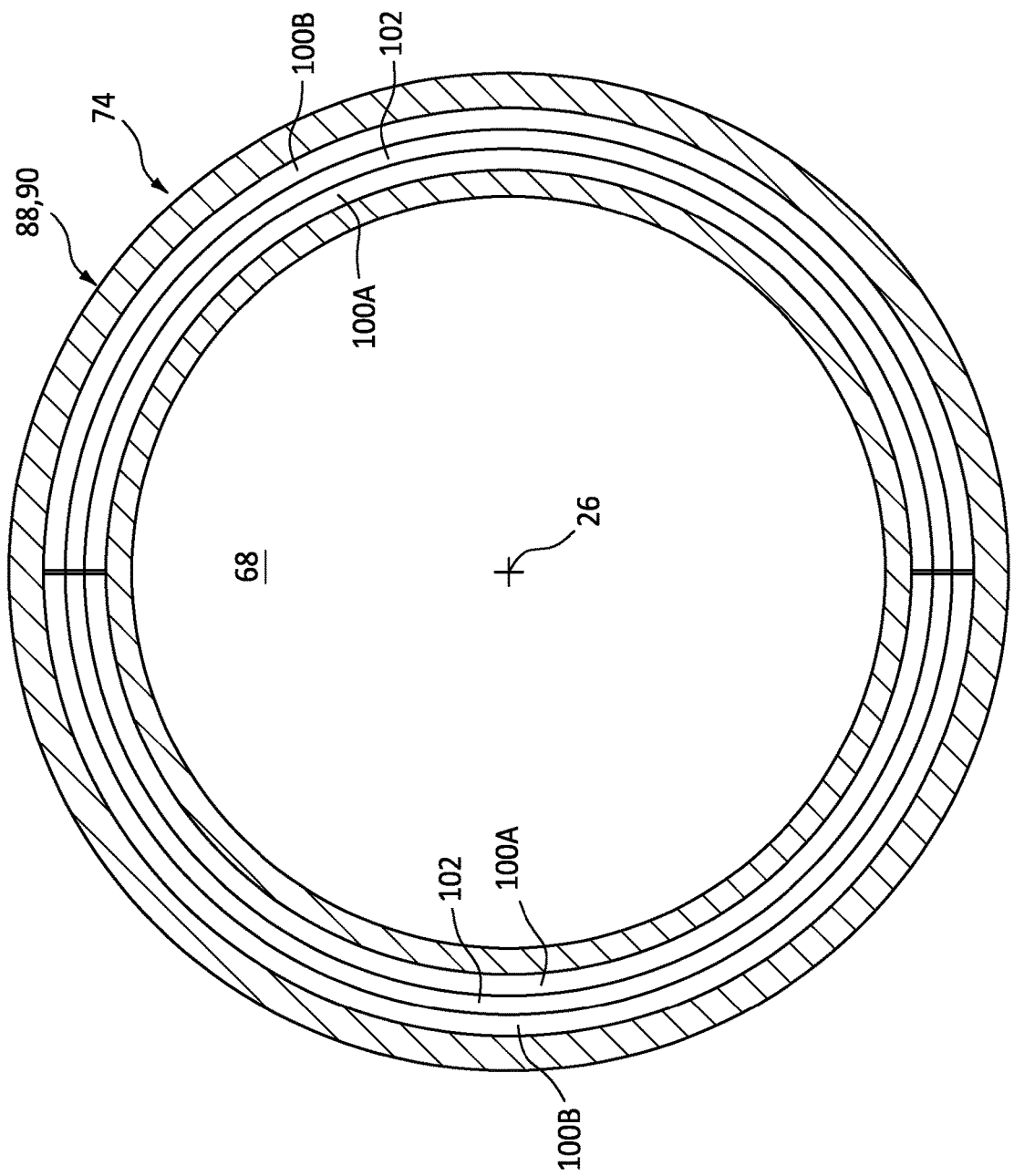
FIG. 9 is a cross-sectional illustration of the heat pipe at the fluid circuit passages, where the fluid circuit passages are circumferentially divided into sub-passages.

In some embodiments, referring to FIG. 6, each fluid circuit passage 100A, 100B, 102 may be configured with an annular cross-sectional geometry when viewed in the reference plane. In other embodiments, referring to FIG. 9, any one, some or all of the fluid circuit passages 100A, 100B and/or 102 may each be circumferentially divided into a plurality of (e.g., fluidly parallel) sub-passages. Each of these sub-passages may have an arcuate (e.g., semi-circular, etc.) cross-sectional geometry when viewed in the reference plane.

In some embodiments, referring to FIG. 3, the inlet structure members 88, 90, 104, 110 and 116 may be configured together into a heat exchange cartridge 128. This heat exchange cartridge 128 may be formed as a (e.g., metal such as copper) monolithic body. Herein, the term "monolithic" may describe an apparatus which is formed as a single, unitary body. At least (or only) the inlet structure members 88, 90, 104, 110 and 116, for example, may be additively manufactured, cast, machined and/or otherwise formed as an integral, unitary body. With such an arrangement, the heat exchange cartridge 128 may be installed with the rest of the engine structure 42 following assembly of the engine rotating assembly 54. When installed, the heat exchange cartridge 128 may be mechanically fastened, bonded (e.g., welded, brazed, etc.) and/or otherwise attached to the rest of the inlet structure 66; e.g., a base of the inlet structure 66 which is formed integral with a remainder (or at least another section) of the engine structure 42.

The turbine engine 22 is described above as a single spool, radial-flow turbojet gas turbine engine for case of description. The present disclosure, however, is not limited to such an exemplary turbine engine. The turbine engine 22, for example, may alternatively be configured as an axial flow gas turbine engine. The turbine engine 22 may be configured as a direct drive gas turbine engine. The turbine engine 22 may alternatively include a geartrain that connects one or more rotors together such that the rotors rotate at different speeds. The turbine engine 22 may be configured with a single spool (e.g., see FIG. 1), two spools, or with more than two spools. The turbine engine 22 may be configured as a turbofan engine, a turboshaft engine, a turboprop engine, a propfan engine, a pusher fan engine or any other type of turbine engine. In addition, while the turbine engine 22 is described above with an exemplary reverse flow annular combustor, the turbine engine 22 may also or alternatively include any other type/configuration of annular, tubular (e.g., CAN), axial flow and/or reverse flow combustor. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a powerplant, comprising:
   a support structure comprising a heat pipe, the heat pipe extending axially along an axis from a first end of the heat pipe to a second end of the heat pipe, the heat pipe extending circumferentially around the axis, and the heat pipe including an evaporator region, a condenser region and a plurality of fluid passages;
   the evaporator region disposed at the second end of the heat pipe;
   the condenser region disposed at the first end of the heat pipe, and the condenser region disposed radially inboard of the evaporator region; and
   the plurality of fluid passages axially between and fluidly coupling the evaporator region and the condenser region;
   a shaft rotatable about the axis; and
   a bearing rotatably mounting the shaft to the support structure, wherein the heat pipe extends axially along and circumscribes the bearing.

2. The apparatus of claim 1, wherein
   the plurality of fluid passages include a first fluid passage and a second fluid passage; and
   the heat pipe comprises a closed-loop internal fluid circuit which extends from the evaporator region, through the first fluid passage, the condenser region and the second fluid passage, back to the evaporator region.

3. The apparatus of claim 2, wherein
   the heat pipe further comprises a working fluid; and
   the heat pipe is configured to circulate the working fluid through the closed-loop internal fluid circuit.

4. The apparatus of claim 3, wherein
the first fluid passage is a liquid passage, and the heat pipe is configured to flow the working fluid in a liquid phase through the liquid passage from the condensing region to the evaporator region; and
the second fluid passage is a gas passage, and the heat pipe is configured to flow the working fluid in a gaseous phase through the gas passage from the evaporator region to the condenser region.

5. The apparatus of claim 4, wherein the gas passage is disposed radially outboard of and extends circumferentially about the liquid passage as the gas passage and the liquid passage extends axially between the evaporator region and the condenser region.

6. The apparatus of claim 4, wherein the liquid passage is disposed radially outboard of and extends circumferentially about the gas passage as the liquid passage and the gas passage extends axially between the evaporator region and the condenser region.

7. The apparatus of claim 4, wherein the liquid passage is filled with a lattice structure.

8. The apparatus of claim 1, wherein at least one of the plurality of passages has an annular cross-sectional geometry at a location axially between the evaporator region and the condenser region.

9. The apparatus of claim 8, wherein the evaporator region has annular cross-sectional geometry at the second end of the heat pipe.

10. The apparatus of claim 8, wherein the evaporator region includes a plurality of evaporators arranged circumferentially about the axis.

11. The apparatus of claim 8, wherein the condenser region includes a plurality of condensers arranged circumferentially about the axis.

12. The apparatus of claim 11, wherein the plurality of condensers projects radially inward from at least one of the plurality of passages.

13. The apparatus of claim 11, further comprising:
a vane array including a plurality of vanes arranged circumferentially about the axis;
each of the plurality of condensers configured with a respective one of the plurality of vanes.

14. The apparatus of claim 1, wherein at least one of the plurality of passages is divided circumferentially into a plurality of sub-passages.

15. The apparatus of claim 1, further comprising an electric machine at least partially housed within a cavity of the support structure, wherein the heat pipe extends axially along and circumscribes the electric machine, and the heat pipe is configured to transfer heat energy away from the electric machine.

16. The apparatus of claim 1, further comprising an inlet structure for the powerplant, the inlet structure including the support structure and a vane array that axially overlaps and circumscribes the heat pipe, the vane array including a plurality of vanes arranged circumferentially about the axis.

17. An apparatus for a powerplant, comprising:
a heat pipe extending axially along an axis from a first end of the heat pipe to a second end of the heat pipe, the heat pipe extending circumferentially around the axis, and the heat pipe including an evaporator region, a condenser region and a plurality of fluid passages;
the evaporator region disposed at the second end of the heat pipe;
the condenser region disposed at the first end of the heat pipe, and the condenser region disposed radially inboard of the evaporator region;
the plurality of fluid passages axially between and fluidly coupling the evaporator region and the condenser region;
the plurality of fluid passages including a first fluid passage and a second fluid passage;
the heat pipe comprising a closed-loop internal fluid circuit which extends from the evaporator region, through the first fluid passage, the condenser region and the second fluid passage, back to the evaporator region; and
the heat pipe further comprising a working fluid, and the heat pipe configured to circulate the working fluid through the closed-loop internal fluid circuit;
wherein the first fluid passage is a liquid passage, and the heat pipe is configured to flow the working fluid in a liquid phase through the liquid passage from the condensing region to the evaporator region;
wherein the second fluid passage is a gas passage, and the heat pipe is configured to flow the working fluid in a gaseous phase through the gas passage from the evaporator region to the condenser region;
wherein the gas passage is disposed radially outboard of and extends circumferentially about the liquid passage as the gas passage and the liquid passage extends axially between the evaporator region and the condenser region;
wherein the liquid passage is an inner liquid passage, and the plurality of fluid passages further include an outer liquid passage; and
wherein the outer liquid passage is disposed radially outboard of and extends circumferentially about the gas passage as the outer liquid passage and the gas passage extends axially between the evaporator region and the condenser region.

* * * * *